US012779679B2

(12) United States Patent
Zhao et al.

(10) Patent No.: US 12,779,679 B2
(45) Date of Patent: Nov. 3, 2026

(54) LEARNING VISUAL FORCE SERVO FOR ROBUST ROBOTIC ASSEMBLY SKILLS

(71) Applicant: FANUC CORPORATION, Yamanashi (JP)

(72) Inventors: Yu Zhao, Santa Clara, CA (US); Tetsuaki Kato, Union City, CA (US)

(73) Assignee: FANUC CORPORATION, Yamanashi (JP)

( * ) Notice: Subject to any disclaimer, the term of this patent is extended or adjusted under 35 U.S.C. 154(b) by 52 days.

(21) Appl. No.: 19/063,879

(22) Filed: Feb. 26, 2025

(65) Prior Publication Data

US 2026/0249452 A1 Aug. 27, 2026

(51) Int. Cl.
*B25J 9/16* (2006.01)
*B25J 13/08* (2006.01)

(52) U.S. Cl.
CPC ............. *B25J 9/163* (2013.01); *B25J 9/1697* (2013.01); *B25J 13/085* (2013.01)

(58) Field of Classification Search
CPC ......... B25J 9/163; B25J 9/1697; B25J 13/085
See application file for complete search history.

(56) References Cited

U.S. PATENT DOCUMENTS

2025/0026009 A1* 1/2025 Zhao ........................ B25J 9/163
2025/0262760 A1* 8/2025 Zhao ...................... B25J 9/1664

OTHER PUBLICATIONS

Jin, Piaopiao, et al. "Vision-force-fused curriculum learning for robotic contact-rich assembly tasks." Frontiers in Neurorobotics 17 (2023): 1280773. (Year: 2023).*
Morel, Guillaume, Ezio Malis, and Sylvie Boudet. "Impedance based combination of visual and force control." Proceedings. 1998 IEEE International Conference on Robotics and Automation (Cat. No. 98CH36146). vol. 2. IEEE, 1998.
Inoue, Tadanobu, et al. "Deep reinforcement learning for high precision assembly tasks." 2017 IEEE/RSJ International Conference on Intelligent Robots and Systems (IROS). IEEE, 2017.

(Continued)

*Primary Examiner* — Dale Moyer

(74) *Attorney, Agent, or Firm* — John A. Miller; Shumaker, Loop & Kendrick, LLP

(57) ABSTRACT

A system for robotic skill learning using vision-force servoing control. A robot performs an assembly operation and a camera, mounted in the workspace or on the robot arm, provides images of the operation. An image encoder neural network is trained to output a vision signal comprising pose features indicating distance from target location, where the vision signal is greatly reduced in size compared to the images. The vision signal is provided to a second neural network along with force/torque and tool center point velocity data. The second neural network operates as a vision-force servo controller, and is co-trained using offline reinforcement learning pre-training and online human operator correction. A pseudo-random sampling technique is used to improve the training of the vision-force control neural network. The vision-force servo controller outputs a next robot motion which is used by a compliance controller to control motion of the robot during the assembly operation.

23 Claims, 7 Drawing Sheets

(56) References Cited

OTHER PUBLICATIONS

Beltran-Hernandez, C. C., Petit, D., Ramirez-Alpizar, I. G., Nishi, T., Kikuchi, S., Matsubara, T., & Harada, K. (2020). Learning force control for contact-rich manipulation tasks with rigid position-controlled robots. IEEE Robotics and Automation Letters, 5(4), 5709-5716.

Zhang, X., Jin, S., Wang, C., Zhu, X., & Tomizuka, M. (May 2022). Learning insertion primitives with discrete-continuous hybrid action space for robotic assembly tasks. In 2022 International conference on robotics and automation (ICRA) (pp. 9881-9887). IEEE.

Lee, Michelle A., Yuke Zhu, Peter Zachares, Matthew Tan, Krishnan Srinivasan, Silvio Savarese, Li Fei-Fei, Animesh Garg, and Jeannette Bohg. “Making sense of vision and touch: Learning multimodal representations for contact-rich tasks.” IEEE Transactions on Robotics 36, No. 3 (2020): 582-596.

* cited by examiner

LEARNING VISUAL FORCE SERVO FOR ROBUST ROBOTIC ASSEMBLY SKILLS

BACKGROUND

Field

The present disclosure relates generally to a method for robot skill learning and, more particularly, to a method for robot assembly skill learning in unstructured environments, where an image encoder neural network is pretrained to provide latent pose features and a second neural network is co-trained to determine a next robot motion based on both image encoder input and force/velocity state feedback.

Discussion of the Related Art

The use of industrial robots to repeatedly perform a wide range of manufacturing and assembly operations is well known. However, some types of tight-tolerance assembly operations, such as installing a peg into a hole or plugging one part into another, are still difficult for robots to perform. These types of operation are often performed manually because robots have difficulty detecting and correcting the complex misalignments that may arise in tight-tolerance assembly tasks. That is, because of minor deviations in part poses due to both grasping and fixturing uncertainty, the robot cannot simply move a part to its nominal installed position, but rather must "feel around" for the proper alignment and fit of one piece into the other. Unstructured environments—where, for example, a robot must grasp a part from a conveyor and assemble it with another component—are even more demanding, as the relative location between parts likely has a large uncertainty and requires motion compensation in order to complete the assembly.

In efforts to make assembly tasks robust to these inevitable positioning uncertainties, robotic systems typically utilize force controllers (aka compliance control or admittance control) where force and torque feedback is used to provide motions commands needed to complete the assembly operation. A traditional way to set up and tune a force controller for robotic assembly tasks is by manual tuning, where a human operator programs a real robotic system for the assembly task, runs the program, and adjusts force control parameters carefully in a trial and error fashion. However tuning and set up of these force control functions using physical testing is time consuming and expensive, since manual trial and error has to be performed. Parameter tuning on real physical test systems may also be hazardous, since robots are not compliant, and unexpected forceful contact between parts may therefore damage the robot, the parts, or surrounding fixtures or structures.

Visual pose estimation and visual servoing control systems are also known which use visual images of an operating environment to guide robot motion. Visual servoing control may be used to guide the robot until part-to-part contact is made, at which point force control takes over. However, in some types of assembly and other operations, it is difficult for visual servoing systems to identify geometric features which can be used for pose detection and correction. Traditional methods often resort to manual teaching of visual servoing systems for feature recognition, or the need for special visual markers to enable more robust recognition of robot position and orientation.

Machine learning systems have recently been applied to robotic assembly applications—where reinforcement learning is used to train the machine learning system based on a force/torque signal. However, these systems suffer from long training times and limited robust range. In unstructured environments with large positional deviations possible, the force feedback signal may provide no clear indication of what correction is needed, and the assembly step may therefore fail to complete.

In view of the circumstances described above, improved methods are needed for learning robotic assembly skills, particularly in tight tolerance and unstructured applications, where robust solutions with reasonable training requirements have until now been unavailable.

SUMMARY

The following disclosure describes a method and system for robotic skill learning using combined visual and force servoing control. A robot arm performs a task, such as an assembly operation, and a camera which is either fixedly mounted in the robot workspace or on the robot arm, provides images of the operation. An image encoder neural network is trained to output a vision signal comprising pose features indicative of distance from target location, where the vision signal is greatly reduced in size compared to the input images. The vision signal is provided to a second neural network along with force/torque and tool center point velocity data. The second neural network operates as a vision-force servo controller, and is co-trained using offline reinforcement learning pre-training and online human operator correction. A pseudo-random sampling technique is used to improve the efficiency and robustness of the training of the vision-force servo controller neural network. The vision-force servo controller outputs a next robot motion which is used by a compliance controller to control motion of the robot during the assembly operation.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a system and method for learning vision-force servo control in robotic operations is merely exemplary in nature, and is in no way intended to limit the disclosed techniques or their applications or uses.

The use of industrial robots for a wide variety of manufacturing and assembly operations is well known. The present disclosure is directed to overcoming the challenges encountered in many robotic operations, such as component assembly, where visual positioning is employed and significant precision is needed in the placement of a workpiece.

Figure 1:
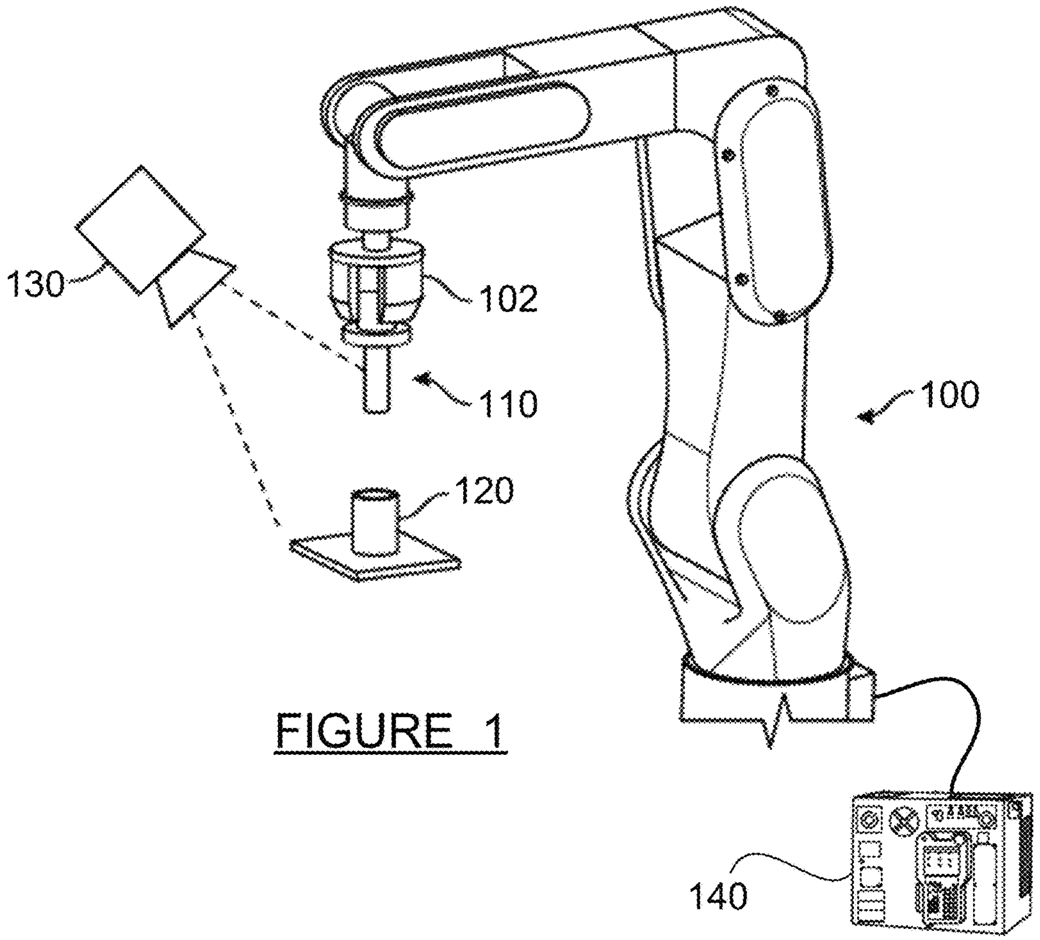
FIG. 1 is an illustration of a robotic assembly operation being performed on tight-tolerance parts, illustrating sources of part positioning uncertainty which create challenges for robotic assembly operations.

FIG. 1 is an illustration of a robotic assembly operation being performed on tight-tolerance parts, illustrating several sources of part positioning uncertainty which create challenges for robotic assembly operations. A robot 100 having a gripper 102 grasps a first part 110 which is to be assembled with a second part 120. In this example, the first part 110 is a peg part, and the second part 120 is a hole structure. The peg part 110 is to be inserted into a hole in the hole structure 120. The tolerances of the parts in a peg-in-hole assembly are typically quite tight, so that the assembly can operate without excessive looseness after assembled. Some peg-in-hole assemblies have dual coaxial pegs on one part, or dual parallel-axis pegs on one part, which must be simultaneously inserted into dual holes on the other part, which makes the assembly operation even more difficult. Pegs and holes which have a shape other than round (e.g., square, oval, etc.) further complicate the alignment and insertion operation. Many other types of mating part assemblies-such as electrical connectors, complex planar shapes, etc.-exhibit similarly tight tolerances.

The types of assembly operations described above are often performed manually because robots have difficulty detecting and correcting the complex misalignments that may arise in tight-tolerance assembly tasks. That is, because of minor deviations in part poses, the robot cannot simply move a part to its nominal installed position, but rather must "feel" the alignment and fit of one piece into the other. There are many possible sources of errors and uncertainty in part poses. First, the exact position and orientation (collectively, "pose") of the peg part 110 as grasped in the gripper 102 may vary by a small amount from the expected pose. Similarly, the exact pose of the hole part 120 in its fixture may also vary from the expected pose. The relative pose uncertainty is even greater in unstructured environments where one or both parts are provided in an imprecise manner such as on a conveyor. In systems where a camera 130 is used to provide images of the workspace scene for location identification, perception error can also contribute to the uncertainty of relative part positioning. In addition, calibration errors in placement of the robot 100 and the fixture holding the part 120 in the workspace, and minor robot joint position variations, can all further contribute to part positioning uncertainty. These factors combine to make it impossible for the robot 100—controlled by a controller 140—to simply pick up the peg part 110 and insert it in a single motion into the hole structure 120.

Figure 2:
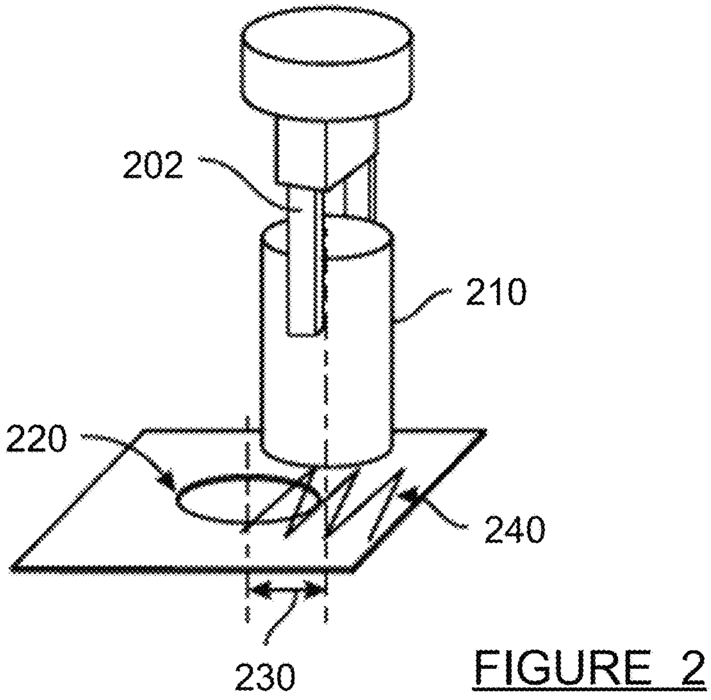
FIG. 2 is an illustration of parts being robotically assembled, where the parts require alignment in a manner which causes the robot to perform a hole search in a plane perpendicular to the insertion axis.

FIG. 2 is an illustration of parts being robotically assembled, where the parts require alignment in a manner which causes the robot to perform a hole search in a plane perpendicular to the insertion axis. A gripper 202 grasps a part 210 which must be inserted into a hole 220 in the same manner as shown in FIG. 1. A distance 230, exaggerated for visual effect, represents the uncertainty in the lateral position of the part 210 relative to the hole 220. In order to find the proper alignment of the part 210 with the hole 220, the robot may be required to perform a hole search, where the gripper 202 moves the part 210 back and forth in a zig-zag pattern 240 in a plane which is perpendicular to the axis of the part 210. In systems with camera image input, the distance 230 may be minimized by visual control, but the robot still cannot simply insert the part 210 into the hole 220 in a single motion.

FIGS. 1 and 2 illustrate examples of assembly operations where tight tolerances require great precision in workpiece placement. One known technique which has been developed for use in these types of robotic assembly operations is the use of a force or compliance controller, discussed below. A compliance controller uses force and torque feedback from one part contacting another to "feel" what corrective motion needs to be applied. Compliance control can be effective in many applications, but it has limitations which are discussed later.

Figure 3:
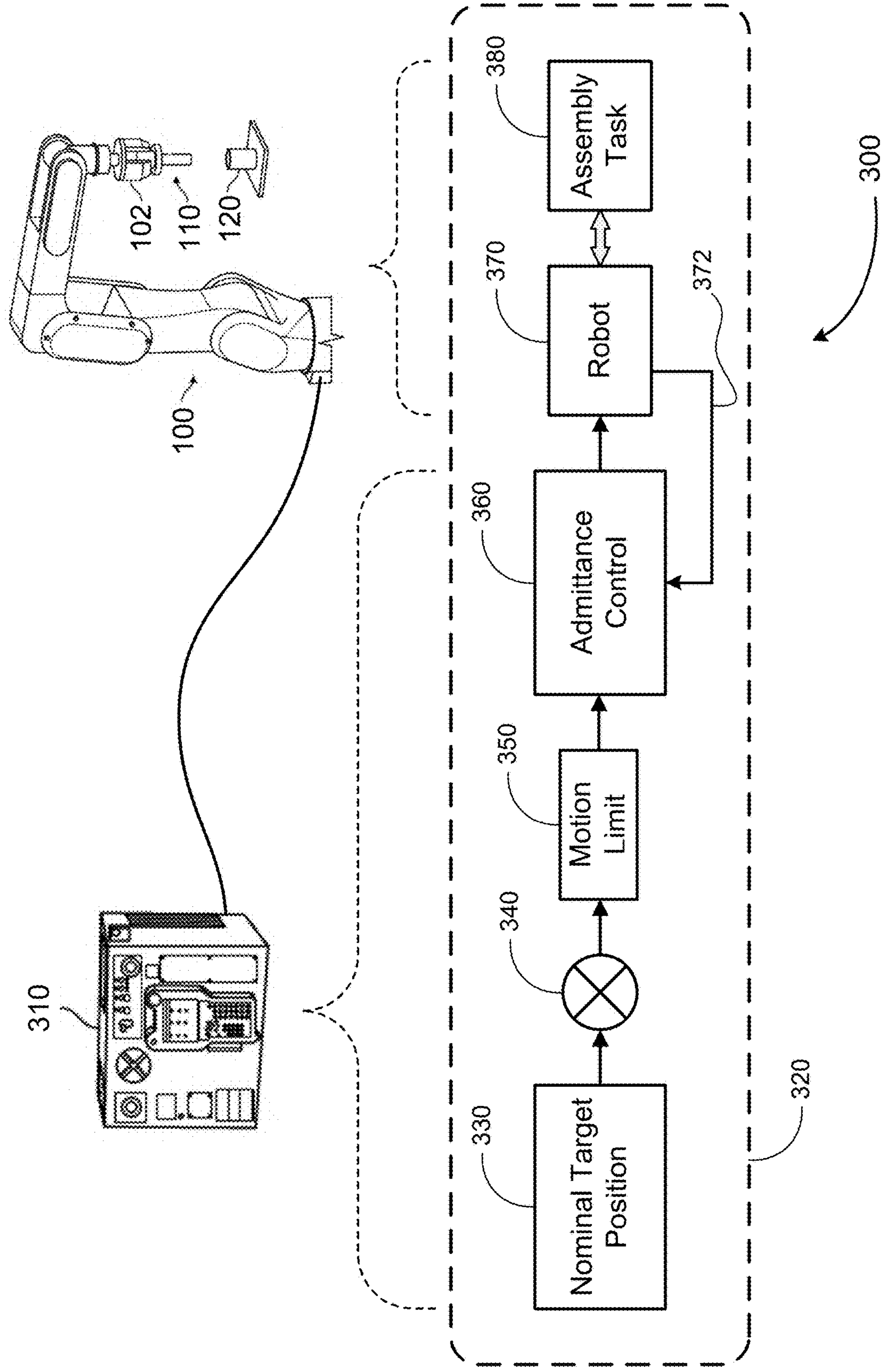
FIGURE 3 (Prior Art)
FIG. 3 is a block diagram illustration of a system configured for a robotic assembly operation using a compliance controller (i.e., force or admittance control), as known in the art.

FIG. 3 is a block diagram illustration of a system 300 configured for a robotic assembly operation using a compliance controller (i.e., force or admittance control), as known in the art. In the physical world, a robot controller 310 communicates with a robot such as the robot 100 of FIG. 1. The controller 310 provides joint motion commands to the robot 100 and receives state feedback from the robot 100, as known in the art and discussed below. As illustrated in FIG. 1, the robot 100 has the gripper 102 grasping the first part 110, and the controller 310 provides commands with the objective of assembling the first part 110 with (into) the second part 120.

A block 320 represents the controller 310 and the robot 100 in block diagram form. The controller 310 is configured as a compliance controller, the functions of which are discussed below. A block 330 provides a nominal target position of the first part 110. The nominal target position could be predefined and unchanging for a particular robot workcell, or the nominal target position could be provided by a vision system based on an observed position of the second part 120, which may be moving on a conveyor for example. For the sake of this discussion, it is assumed that the position of the second part 120 in the robot workcell is known, and the nominal target position from the block 320 defines the position of the first part 110 to install it into the second part 120. The nominal target position of the first part 110 may then be transformed to gripper coordinates, which can then be converted to robot joint positions using inverse kinematics in a known manner.

A summing junction 340 is included after the block 330. Although the junction 340 does not have a second input in FIG. 3, a second input may be added in some embodiments, such as for adjusting the nominal target position based on some other factor. A block 350 defines motion limits of the robot 100. The motion limits ensure that the robot 100 does not take an excessively large motion step during the control process, where excessively large motion could create a hazardous situation or result in forceful contact between the robot 100 and/or the parts 110/120 with each other or with other objects in the workcell. If the difference between the target position and the current position is greater than the motion limit, then the motion limit will prevail and limit the size of the step.

A block 360 includes an admittance control function which interacts with the robot in a block 370 performing the assembly task in a block 380. The blocks 370 and 380 represent the physical actions of the robot 100 as it installs the first part 110 into the second part 120. The robot in the block 370 provides state feedback on a line 372 to the admittance control function in the block 360. The state feedback provided on the line 372 includes robot joint states (joint position/velocity), along with contact forces and torques. Alternately, tool center point position and velocity state data may be provided in Cartesian coordinates, which can readily be converted to joint coordinates, or vice versa, via the transformation calculations described above. A force and torque sensor (not shown) is required in the operation of the robot 100 to measure contact forces between the parts 110 and 120, where the force and torque sensor could be positioned between the robot 100 and the gripper 102, between the gripper 102 and the first part 110, or between the second part 120 and its "ground" (fixing device). The contact force and torque can also be measured from robot joint torque sensors or estimated from other signals such as motor currents, although direct sensing of contact force and torque is preferable.

The admittance control function in the block 360 operates in the following manner, as known in the art and discussed only briefly here. Impedance control (or admittance control) is an approach to dynamic control relating force and position. It is often used in applications where a manipulator interacts with its environment and the force-position relation is of concern. Mechanical impedance is the ratio of force output to motion input. Controlling the impedance of a mechanism means controlling the force of resistance to external motions that are imposed by the environment. Mechanical admittance is the inverse of impedance—it defines the motions that result from a force input. The theory behind the impedance/admittance control method is to treat the environment as an admittance and the manipulator as an impedance.

Using the next-step target position from the junction 340 and the next-step motion limit from the block 350, the admittance control function in the block 360 computes a target velocity (in six degrees of freedom) to move the workpiece from its current position to the target position (or the motion limited step size). The admittance control function then computes a command velocity by adjusting the target velocity with a force compensation term, using an equation such as:

$$V = V_d + K_v^{-1} F,$$

where V is the command velocity vector (this equation applies to translational motion), $V_d$ is the target velocity vector, $$K_v^{-1}$$

is the inverse of an admittance gain matrix, and F is the measured contact force vector from the force sensor fitted to the robot or the workpiece. The vectors all include three translational degrees of freedom in this example. A similar equation is used to compute rotational command velocities @ using contact torque feedback.

The command velocities computed as described above are then converted to command joint velocities $$\dot{q}_{cmd}$$

for all robot joints by multiplying the inverse of a Jacobian matrix J by the transpose of the command velocities vector, as follows:

$$\dot{q}_{cmd} = J^{-1}[V, \omega]^T.$$

A low pass filter may also be provided after the computation of the command joint velocities to ensure smoothness and feasibility of the commanded velocities. The computed command joint velocities are provided to the robot, which moves and measures new contact forces, and the target position is again compared to the current position and the velocity calculations are repeated. Using the force feedback and the robot state feedback on the line 372, the admittance control function in the block 360 repeatedly provides motion commands to the robot in the block 370 in attempting to reach the target position from the junction 340.

The elements 330-360 are programmed as an algorithm in the controller 310. The interaction of the controller 310 with the robot 100 occurs via a cable (or wirelessly) in the real world, and this interaction is represented in the block 320 by the forward arrow (motion commands) from the block 360 to the block 370 and the feedback line 372 (robot states and contact forces).

As mentioned earlier, traditional compliance control techniques are not effective for all types of assembly tasks. For example, in tight-tolerance assembly operations, and in cases such as in FIG. 2 where the initial position is significantly offset from the target position, the robot in the block 370 may spend a long time in the feedback loop with the admittance control function in the block 360, and may never ultimately complete the assembly task, including the possibility of part damage in the process. This is because when the part 210 is not substantially aligned with the hole 220, the force/torque feedback may not provide useful information about how to improve the alignment. This situation may be somewhat alleviated by fine tuning of the impedance/admittance control parameters, but this is only effective in some situations, and only for a particular workpiece assembly operation.

Another robot control technique which has been developed for assembly and other precision motion applications is visual servoing. In visual servoing, rather than controlling the robot to move a workpiece to a nominal target position at a predefined constant location, the required workpiece movement is dynamically adjusted based on images of the workpiece and the operating environment. As the robot moves the workpiece, new images are provided and the adjusted target position is refined in a feedback control loop.

Like compliance control, visual servoing has been proven effective in some robotic applications. However, visual servoing also has shortcomings-including occlusion in the images, depth inaccuracies when using a 2D camera, processing speed when using a 3D camera, and others- and visual servoing techniques are therefore often unable to meet the challenge of robotic assembly and other precision motion application.

The techniques of the present disclosure have been developed to address the shortcomings of existing visual servoing and compliance control techniques, and are discussed in detail below.

Figure 4:
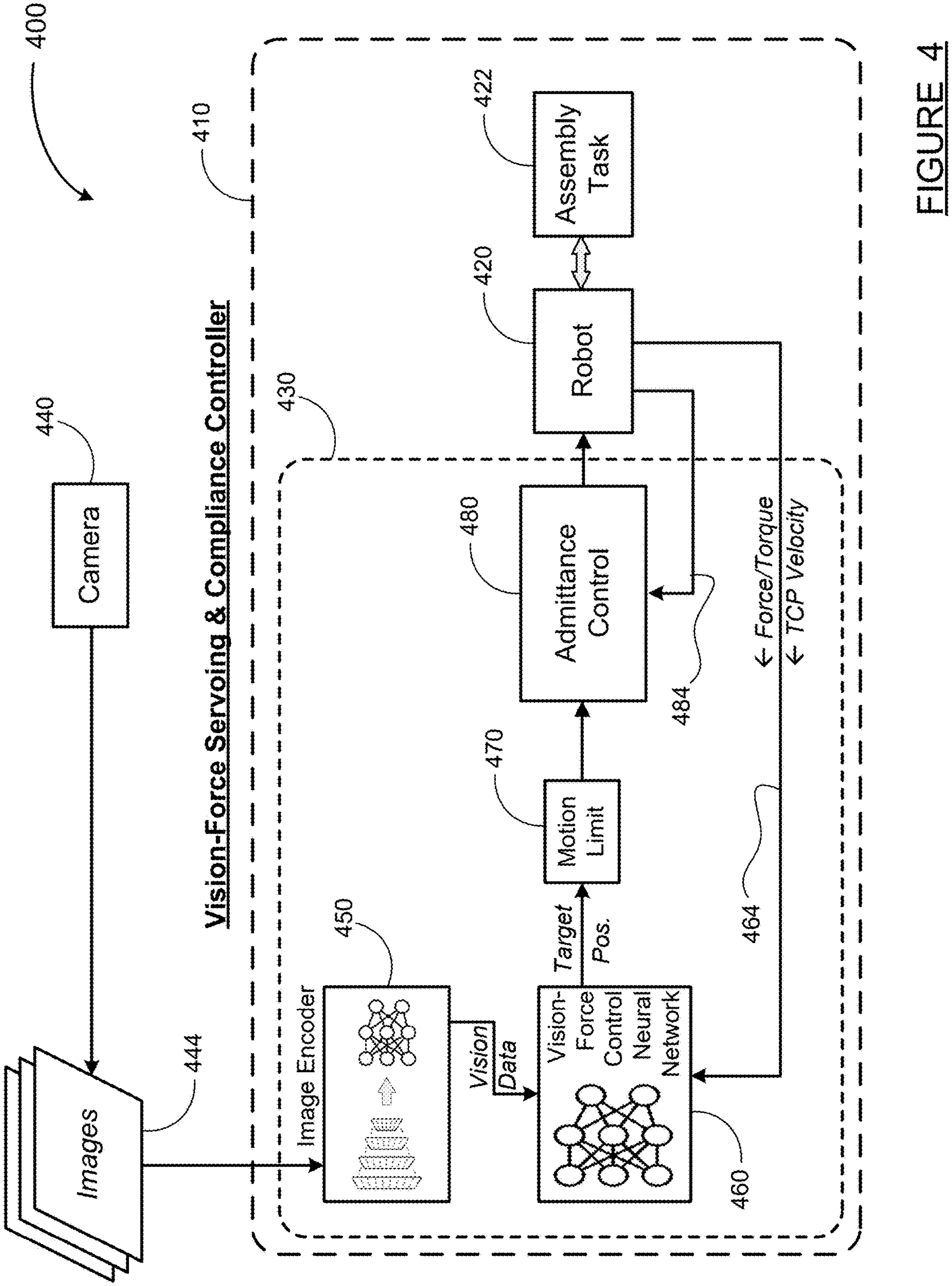
FIG. 4 is a block diagram illustration of a system configured for robotic positioning of a workpiece, using compliance control integrated with a vision-force servo control neural network and an image encoder, according to an embodiment of the present disclosure.

FIG. 4 is a block diagram illustration of a system 400 configured for robotic positioning of a workpiece, using compliance control integrated with a vision-force servo control neural network and an image encoder, according to an embodiment of the present disclosure. The elements of the block diagram of FIG. 4 correspond with the real-world robot and controller in the same manner as shown in FIG. 3 and discussed above. Another real-world element, a camera, is shown in FIG. 4 and communicates with the controller-providing images of the robot/workpiece scene for processing by the image encoder.

A vision-force servoing and compliance controller block 410 includes a robot 420 and a controller 430, in a manner similar to that discussed with respect to FIG. 3. The robot 420 performs an assembly task shown in box 422, as also discussed earlier. The robot 420 and the assembly task 422 are shown within the block 410 because of the nature of the interaction (robot manipulating one part which contacts another part) and feedback (contact force/torque and robot states) to the controller 430. Because of this interaction, it can all be considered one system which physically comprises the robot 420, the workpieces, and the controller 430.

A camera 440 provides images 444 of the robot workspace (i.e., the assembly operation scene). The camera 440 may be a fixed camera at a location in the workspace where it has a good point of view to obtain images of the operation, or the camera 440 may be mounted at the end of the robot arm and providing images of the first and second workpieces which change point of view as the robot arm moves. The type of location/mounting of the camera 440 may be determined as most suitable for any particular application. The methods and systems of the present disclosure may be used with any of the types of cameras and images discussed above.

The images 444 are provided to an image encoder 450 which is running on the controller 430. The image encoder 450 is a neural network module which receives the images 444 as input, and outputs latent pose features—that is, features which characterize the relative position of the workpieces being assembled. The image encoder 450 may include any of one or more types of neural networks suitable for the image encoding application. In one embodiment, the image encoder 450 comprises a convolutional neural network (CNN) providing its output to a multilayer perceptron (MLP). A CNN is a type of feed-forward neural network that learns features by itself via filter (or kernel) optimization, and is particularly suited to image classification. An MLP is a feed-forward neural network, consisting of fully connected neurons with a nonlinear activation function, organized in at least three layers. Together, the CNN and the MLP take the images 444 (which are of very high data density) and reduce them to output feature vectors having much lower dimensionality. Any other suitable image encoder architecture may also be used. Training of the image encoder 450 is discussed below.

The image encoder 450 outputs the latent pose features, which are provided to a vision-force control neural network 460. The vision-force control neural network 460 is another neural network module, and is configured and trained to provide a next-step robot motion or target position based on the vision data from the image encoder 450, along with force/torque feedback and tool center point velocity feedback from the robot 420. In one embodiment, the vision-force control neural network 460 is also an MLP, but it is completely separate from any MLP that may be included in the image encoder 450. Training of the vision-force control neural network 460 is discussed in detail below.

The vision-force control neural network 460 provides an output target position to a motion limit block 470 and in turn to an admittance control block 480, which operate as discussed above with respect to FIG. 3. That is, the next robot motion from the vision-force control neural network 460 (motion-limited if necessary) is used by the admittance control block 480, along with force and state feedback from the robot 420, to compute actual robot joint velocity commands and send those commands to the robot 420.

The system 400 operates continuously—with new images from the camera 440, a new target position computed by the vision-force control neural network 460, and new commands to the robot 420 from the admittance controller 480, along with the two feedback loops—until the assembly operation is completed. The operating frequency of the various modules-including the camera image rate, the cycle frequency of the vision-force control neural network 460, and the robot control cycle frequency of the admittance controller 480—may all be different. Typically, the robot control cycle frequency of the admittance controller 480 is higher than the cycle frequency of the vision-force control neural network 460.

The system of FIG. 4 provides integrated control which takes advantage of the benefits of visual servoing control (which is particularly effective for the larger motions when the workpiece is being moved from an initial position toward the target position), and the benefits of compliance control (which is particularly effective for the fine positioning motions needed during tight-tolerance placement of the workpiece, such as when being assembled with a mating part).

Results have shown that by combining vision data with force/torque feedback, the vision-force control neural network 460 provides very effective robot control in unstructured assembly operations. Furthermore, these results are achieved with a minimal amount of neural network training time, using the disclosed two-phase training approach. All of this is discussed further below.

One skilled in the art may envision other, similar, hardware embodiments which are within the scope of the present disclosure. For example, in another embodiment, the robot controller 430 (which directly sends motion commands to the robot) only includes the motion limit block 470 and the admittance control block 480, while the two neural network modules (the image encoder 450 and the vision-force control neural network 460) run on a separate computer, such as a computer with architecture optimized for neural network systems. Still other, similar embodiments may also be envisioned.

The image encoder 450 requires training in order to produce the desired latent feature vector output. In a preferred embodiment, unsupervised learning is used for training the image encoder 450. For example, sequences of images taken during the assembly operation may be provided for the training, where each sequence begins with the part some distance from its installed/assembled position and ends with the robot gripper having successfully installed the part into its assembled position. A contrastive learning technique may be employed, where a loss function is used to train the image encoder so that the output latent pose feature vector corresponds with the temporal distance to the target position. Specifically, if a latent pose feature vector C is produced by the image encoder 450 for each image, then the loss function may be constructed based on a vector multiplication of one image's feature vector by the transpose of another image's feature vector. These vector/transpose multiplications are carried out in a log-summation loss function calculation which can be used to train the image encoder 450 to provide the desired output latent pose feature vector.

Other unsupervised learning techniques besides contrastive learning may be used for training the image encoder 450. One such other method is variational auto-encoder (VAE). Regardless of the specific training technique, unsupervised learning provides a convenient method of training the image encoder 450 to compress the camera images into feature vectors having a much smaller data footprint while still reliably characterizing the positional state of the workpieces being assembled.

The vision-force control neural network 460 also requires training in order to produce the desired target position output based on inputs including the vision data (latent pose features), part-to-part contact force and torque data, and tool center point velocity. In a preferred embodiment, a combination of offline pre-training and online self-learning is used for training the vision-force control neural network 460.

Figure 5:
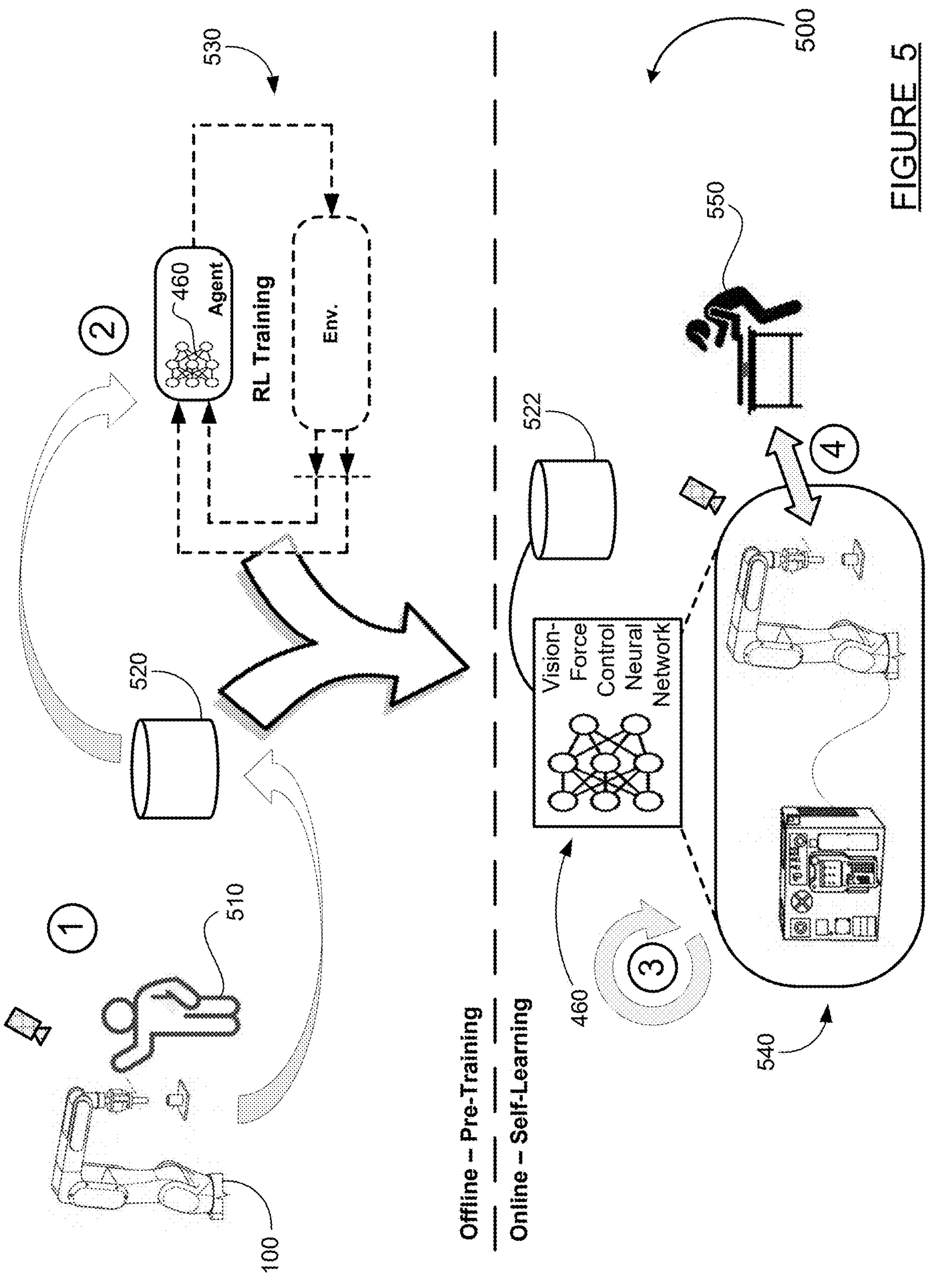
FIG. 5 is a conceptual illustration of a system for robot assembly skill learning combining human demonstration and reinforcement learning-based discovery, according to an embodiment of the present disclosure.

FIG. 5 is a conceptual illustration of a system 500 for robot assembly skill learning combining human demonstration and reinforcement learning-based discovery, according to an embodiment of the present disclosure. A robot such as the robot 100 with a compliance controller is configured to perform an assembly operation, as discussed earlier. A camera is provided in the workspace or on the robot arm, as also discussed earlier.

In a first step of the training process (see number 1), a human operator 510 demonstrates the assembly operation in cooperation with the robot 100. One technique for demonstrating the operation involves putting the robot 100 in a teach mode, where the human 510 either manually grasps the robot arm or gripper and workpiece and moves the workpiece into the installed position in the second workpiece (while the robot and controller monitor robot and force states), or the human 510 uses a teach pendant to provide commands to the robot 100 to complete the workpiece installation. Another technique for demonstrating the operation is teleoperation. In one form of teleoperation, the human 510 manipulates a duplicate copy of the workpiece which the robot 100 is grasping, and the human 510 moves the duplicate workpiece (which is instrumented and provides motion commands to the robot 100) while watching the robot 100, using the visual feedback from the robotic assembly operation and the human's own tactile feel to guide the successful completion of the assembly operation by the robot 100. In another form of teleoperation, the human 510 uses a joystick-type input device to provide motion instructions (translations and rotations) to the robot 100. These or other human demonstration techniques may be used.

The human demonstrator 510 preferably demonstrates the assembly operation several times, so that several complete sets of state and action data, each leading to successful installation, may be collected. The demonstration data (robot motion states, contact force/torque data, and images transformed to latent pose features by the image encoder as discussed earlier) is collected in a database 520.

In a second step ((2)), the demonstration data from the database 520 is used for reinforcement learning (RL) training of the vision-force control neural network 460 as indicated at 530. In the reinforcement learning 530, an agent (the vision-force control neural network 460) learns what actions are effective in correlation to a set of robot states, force/torque and vision data (all contained in the database 520), based on reward data. The purpose of reinforcement learning is for the agent to learn an optimal, or nearly-optimal, policy that maximizes the "reward function" or other user-provided reinforcement signal that accumulates from rewards (successful completion of the assembly operation).

In this reinforcement learning pre-training phase at 530, there is no physical environment interacting with the agent as discussed earlier. Instead, in the pre-training mode, the agent (the vision-force control neural network 460) in the reinforcement learning pre-training phase 530 is trained purely based on the demonstration data from the first step. Thus, the environment block and the feedback lines are all shown as dashed (not used) in the reinforcement learning pre-training phase 530.

In a third step of the process, the pre-trained vision-force control neural network 460 and a compliance controller/robot system 540, along with the required camera, are placed in an online production mode where self-learning occurs. The compliance controller/robot system 540 may use the same robot 100 as was used for human demonstration, or a separate instance of the same robot configuration. In the online self-learning mode, the compliance controller/robot system 540 repeatedly performs the prescribed installation (assembly operation) in a production mode, using the vision-force control neural network 460 which was pre-trained in the earlier step. This is essentially the system shown in FIG. 4, where the learning feature is added in FIG. 6 and discussed below.

As the vision-force control neural network 460 and the compliance controller/robot system 540 perform assembly operations in the third step, more cycles of learning data accumulate and are stored in a database 522. The database 522 initially includes the human demonstration data from the database 520, and data from the ongoing operation in the third step is added to the database 522. The data includes the action, state, vision data and reward data needed for reinforcement learning training of the vision-force control neural network 460, as discussed earlier.

If the assembly operation is not particularly difficult, the vision-force control neural network 460 and the compliance controller/robot system 540 may run indefinitely in the online self-learning mode, with a very high success rate. This would be the case when the installation of the first part into the second part has a fairly loose tolerance, or the parts include geometric features which mechanically guide one part into the other, for example. However, in tight-tolerance assembly operations, some attempted installations may be unsuccessful, and failure data in the database 522 may begin to adversely affect the learning and performance of the vision-force control neural network 460. That is, when positive reward data is sparse, the neural network in the agent (the vision-force control neural network 460) cannot properly correlate effective actions to given states; this results in a deterioration of performance.

Because of the situation described above, in the techniques of the present disclosure, a fourth step is added for difficult assembly operations. The fourth step is a co-training mode where human correction is provided during the online self-learning mode. The human correction (co-training) phase includes monitoring the success rate of the assembly operations in the online self-learning mode. If the success rate drops below a predefined threshold, or attempted assembly operations exhibit searching behavior which is clearly off-base, then a human operator 550 steps in and interacts with the compliance controller/robot system 540 to override the reinforcement learning of the vision-force control neural network 460. The preferred mode of interaction between the human operator 550 and the compliance controller/robot system 540 is teleoperation, which was discussed above.

By using the human intervention/correction step (co-training) described above, new successful learning cycles are added to the database 522, such that the high reward values provide beneficial update training of the agent (the vision-force control neural network 460) to identify effective actions for given states. The human intervention/correction step may be performed for a period of time, with the human operator 550 monitoring and intervening as necessary to ensure that each attempted assembly operation is successful. After this period of co-training, it would be expected that the vision-force control neural network 460 and the compliance controller/robot system 540 resume autonomous operation in the online self-learning production mode.

Figure 6:
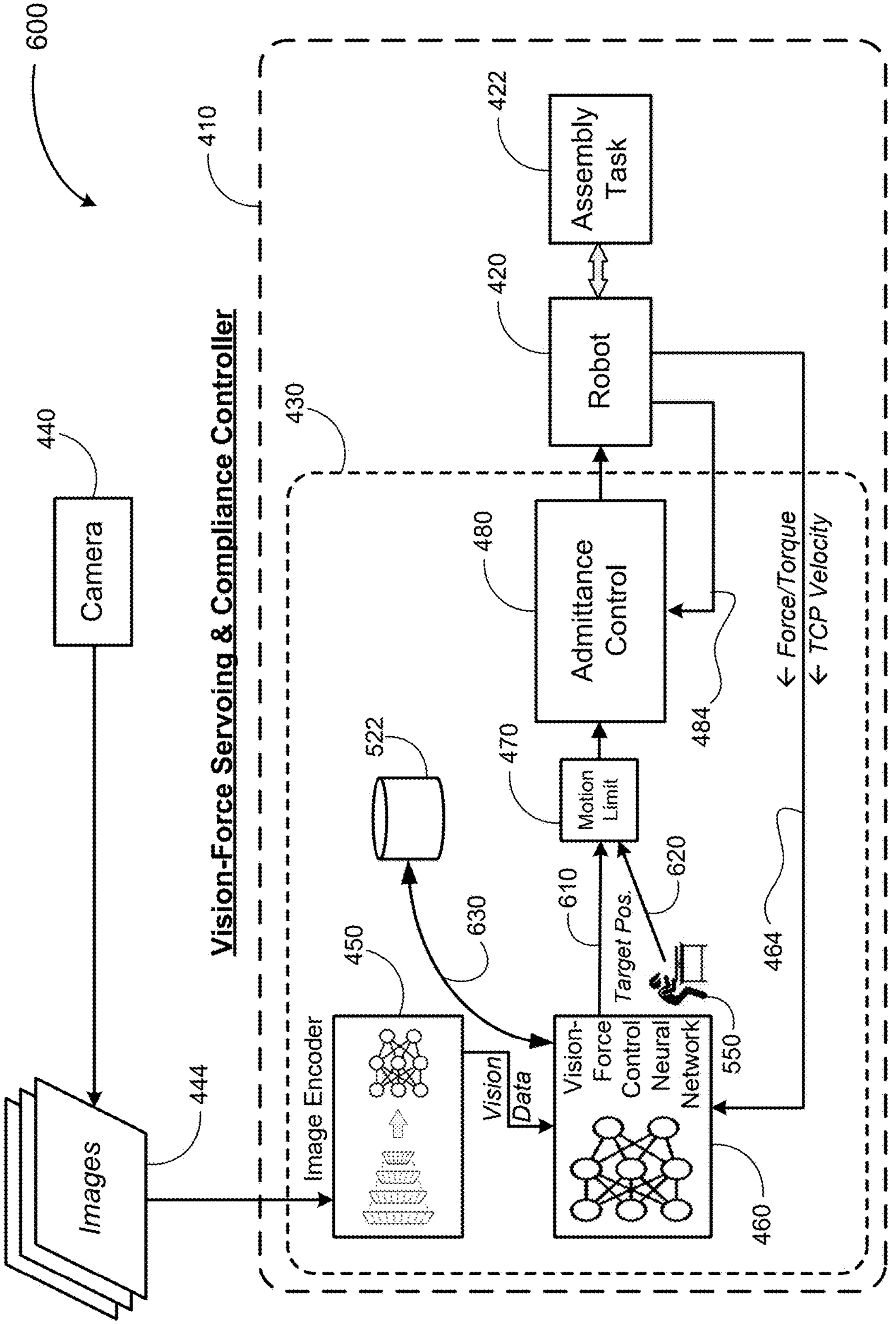
FIG. 6 is a block diagram illustration of a system configured for robotic assembly skill learning, using a compliance controller with a vision-force servo control neural network, including a co-training mode for human correction during ongoing self-learning, according to an embodiment of the present disclosure.

FIG. 6 is a block diagram illustration of a system 600 configured for robotic assembly skill learning, using a compliance controller with a vision-force servo control neural network, including a co-training mode for human correction during ongoing self-learning operations, according to an embodiment of the present disclosure. FIG. 6 includes all of the elements of FIG. 4, with the addition of the reinforcement learning and co-training features depicted in FIG. 5 and discussed above. These additional features enable the system of FIG. 4 to be operated as a vision-force servoing robotic assembly system with ongoing self-learning capability.

In FIG. 6, the vision-force servoing and compliance controller block 410 includes the robot 420 and the controller 430, and the camera 440 is also provided in the workspace or on the robot arm, as discussed earlier with respect to FIG. 4. The controller 430 includes the image encoder 450 and the vision-force control neural network 460, as also discussed in detail earlier. In order to facilitate continuous self-learning, the database 522 is included in the controller 430. Additionally, there are now two possible options for control of the robot 420; either the vision-force control neural network 460 provides the target position to the admittance control block 480 on a line 610 (in normal autonomous operation and self-learning mode), or the human operator 550 uses teleoperation to provide the target position to the admittance control block 480 on a line 620 (in co-training mode). In either case, all of the data from the assembly operations is provided to the database 522 for ongoing reinforcement learning; this includes the robot or tool center point motion states, contact force/torque data, and images transformed to latent pose features by the image encoder, along with the reward data (ultimate success of the assembly operation).

The system of FIG. 6 is a self-learning system which provides all of the advantages of both visual servoing and force control, by virtue of the vision-force control neural network 460 and its interaction with the other system elements. The system of FIG. 6 is used for production operations to perform the designated task—e.g., the assembly of one part with another. Autonomous operation with continuous self-learning may be used for the majority of the time, and in the event that assembly failures begin to occur regularly, the human operator may take over and run the system in co-training mode in order to re-establish a baseline of successful operations in the training data contained in the database 522.

The system of FIG. 6 has been demonstrated to be very effective in learning and performing tight-tolerance assembly tasks in unstructured environments where initial relative pose is highly variable. One factor which affects the capability of the vision-force servoing control system is the initial pose sampling technique which is used in the pre-training and self-learning phases discussed above. Effectiveness of the vision-force servoing control system can be improved through proper design the sampling of the initial pose space in a manner discussed below.

Figure 7:
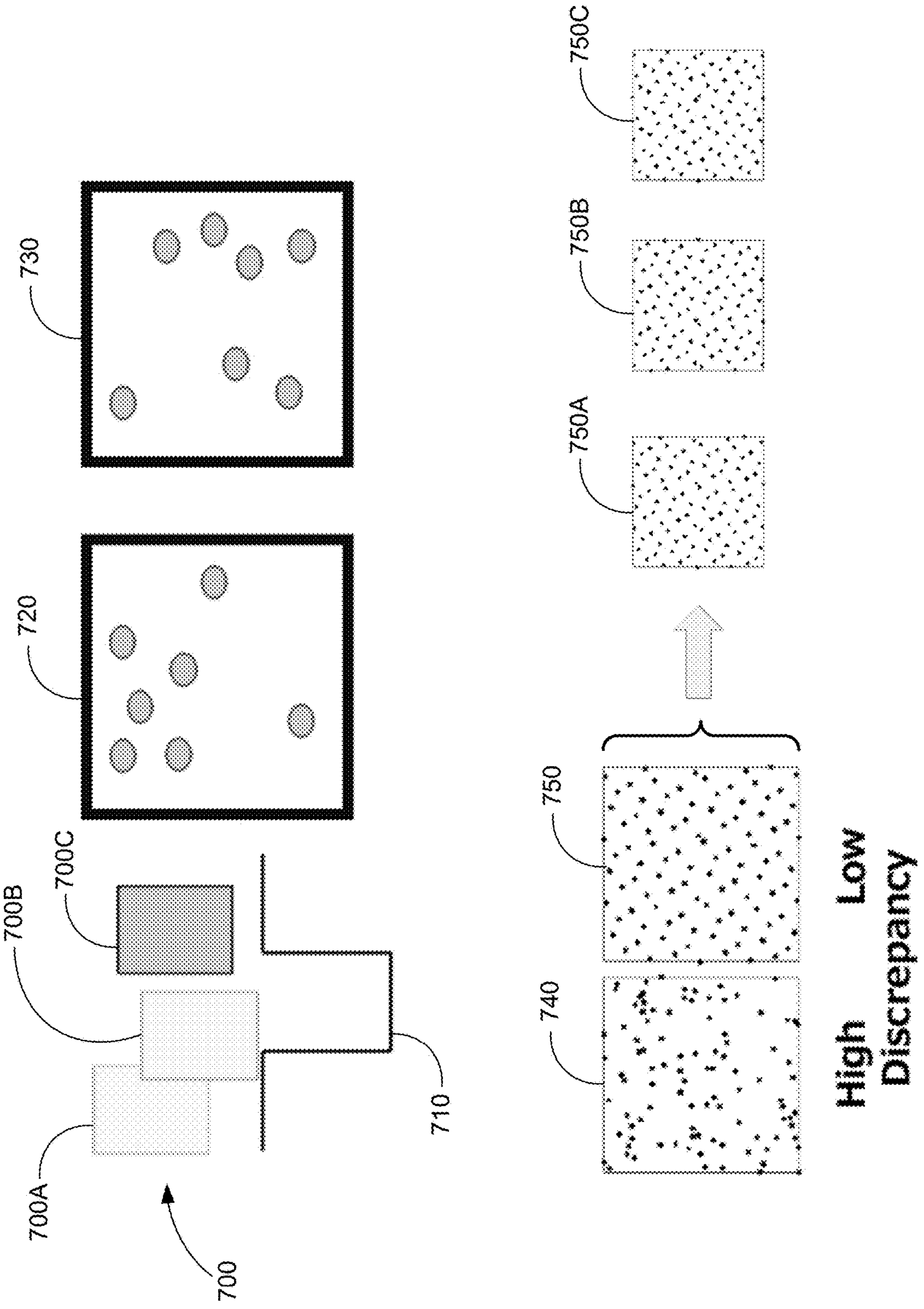
FIG. 7 is an illustration of various techniques for initial pose sampling in reinforcement learning training of a neural network, including a low-discrepancy sequence pseudo-random sampling technique as used in embodiments of the present disclosure.

FIG. 7 is an illustration of different techniques for initial pose sampling in reinforcement learning training of a neural network, including a low-discrepancy sequence pseudo-random sampling technique as used in embodiments of the present disclosure. Shown at the top left of FIG. 7 is a workpiece 700 which is a peg-like part to be fitted into a hole of a second workpiece 710. The workpiece 700 is shown in three different initial poses-indicated as 700A, 700B and 700C.

It can be understood in the context of the preceding discussion that each of the three initial poses of the workpiece 700 will result in a dramatically different sequence of motions by the compliance controller in order to attempt to complete the installation. The different motion sequences, and their ultimate success or failure, are what is captured in the training database and used for pre-training or self-learning of the vision-force servoing control system.

Proper training of the vision-force servoing control system thus relies on a well-defined training sample set. On one hand, a very large sample set—while ensuring complete coverage of the initial pose sample space—is undesirable due to the amount of time it takes to train a neural network with such a large number of samples. On the other hand, a small set of training samples may not provide consistent results from the neural network after training. This is discussed below.

A first training set 720 includes a sparse (low in number) set of initial poses which is biased toward one side and corner of the sample space, and a second training set 730 includes a set of initial poses which is biased toward a different side and corner of the sample space. The training sets 720 and 730 (and others in FIG. 7) are illustrated as top views which depict the lateral (e.g., X and Y) position of the initial pose. The vertical position of the initial pose may also vary, as illustrated in the three initial poses of the workpiece 700 at the left.

When the number of training samples is small and the distribution of the samples is biased, as in the training sets 720 and 730, the training performance of the neural network is not consistent. That is, the vision-force servoing control system may perform poorly overall (e.g., slow to assemble workpieces with a lot of wasted motion, and failure of some assembly operations) and/or may perform poorly for initial poses which are distant from the biased sample set. A solution to the training set design dilemma is found in defining the training sample set using pseudo-random sampling with low discrepancy.

A training sample set 740 includes a fairly sparse set of training samples defined randomly throughout the sample space. The sample set 740 exhibits a high discrepancy between the individual samples. A training sample set 750 includes the same (sparse) number of training samples as in the set 740, but where the samples in the set 750 are defined pseudo-randomly with low discrepancy in the sample space. Pseudo-random sampling with low discrepancy means that each training sample has a randomly-selected initial location, but conditions are placed on the location of each sample so that the overall distribution is not biased in any particular direction.

Using pseudo-random sampling with low discrepancy provides consistent neural network performance after training, but keeps the training time short by virtue of the relatively small sample set size. In a simulation using three different pseudo-random sample sets with low discrepancy (identified as 750A, 750B and 750C), the vision-force servoing control system with the trained neural network exhibited consistently good performance with each of the sample sets. Thus, in preferred embodiments of the vision-force servoing control system of the present disclosure, pseudo-random sample sets with low discrepancy are used to train the vision-force control neural network 460—both for offline pre-training and for online self-learning as illustrated in FIG. 5.

Figure 8:
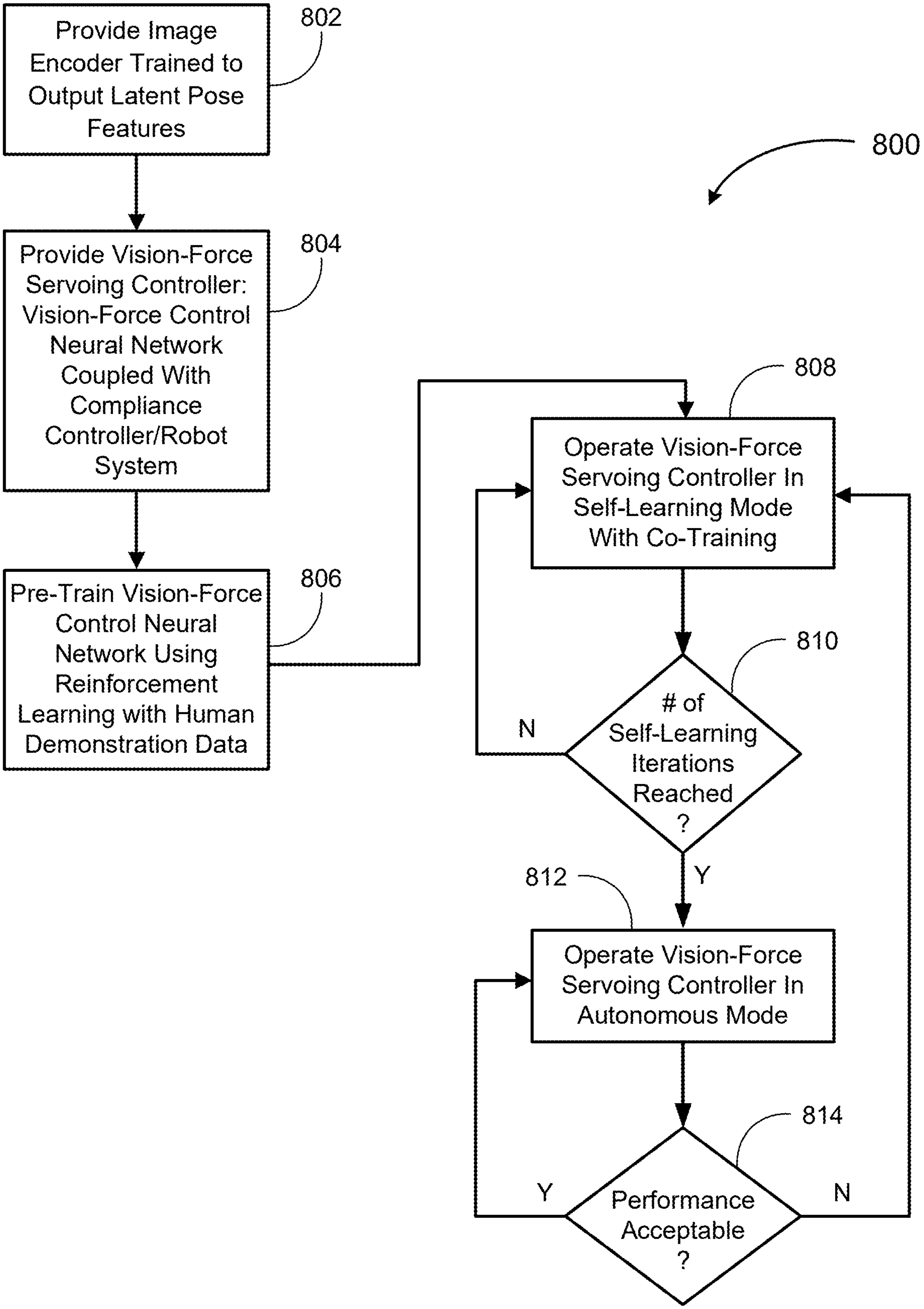
FIG. 8 is a flowchart diagram of a method for robotic assembly skill learning using a vision-force servoing compliance controller, including offline pre-training using human demonstration data and online self-learning with human co-training, according to an embodiment of the present disclosure.

FIG. 8 is a flowchart diagram 800 of a method for robotic assembly skill learning using a vision-force servoing compliance controller, including offline pre-training using human demonstration data and online self-learning with human co-training, according to an embodiment of the present disclosure. At box 802, an image encoder is provided, where the image encoder is trained to output latent pose features from images of a workpiece operational scene. As discussed earlier, the image encoder is preferably trained in unsupervised learning using sequences of images from a workpiece assembly operation. The image encoder produces latent pose features which capture the essence of the image (such as a temporal distance from the workpiece to the destination location) in a small amount of data, where the original images consume a large amount of data. The output of the image encoder is used as input to the vision-force control neural network.

At box 804, a vision-force servoing controller system is provided. This is the controller 410 of FIGS. 4 and 6. The vision-force servoing controller system includes the vision-force control neural network 460 and a compliance/admittance control block 480 (both running on the robot controller 430), along with the robot 420 performing the assembly task 422. The robot controller 430 also includes or receives input from the image encoder 450 provided at the box 802. The vision-force control neural network 460 is configured to receive inputs including the vision data from the image encoder 450, and feedback (contact force/torque sensor data, and tool center point velocity or other robot state data), and provide a target position for the next step of robot motion as output.

At box 806, the vision-force control neural network 460 is pretrained using reinforcement learning with human demonstration data. This training was illustrated as steps 1 and 2 in FIG. 5. The pre-training includes creating a training database containing data from the human demonstration cycles and using the database for reinforcement learning of the neural network 460.

At box 808, the vision-force servoing controller system is operated in self-learning mode, where the vision-force control neural network 460 provides a next step target position to the admittance control block 480, which in turn uses compliance/admittance control to control movement of the robot 420. When operating in the self-learning mode, the vision-force servoing controller system stores data for ongoing reinforcement learning training in the database 522, as shown in FIG. 6. This data includes the action, robot state, vision data and reward data needed for reinforcement learning training of the vision-force control neural network 460. The vision-force servoing controller system operates in the self-learning mode for a certain number of iterations—where the number of iterations is predefined to provide suitable results. During the operation in self-learning mode, the vision-force servoing controller system uses the pseudo-random sampling technique described earlier, for efficient and effective training. Also during the operation in self-learning mode, human co-training is used as depicted in FIG. 6 and discussed earlier. That is, for iterations where the vision-force control neural network 460 is struggling to complete the assembly operation, the human operator 550 can take over (e.g., using tele-operation) and guide the robot gripper to perform the assembly process. For all of the iterations completed while in self-learning mode at the box 808, the data is not only stored in the database 522, but is also used for ongoing self-leaning of the vision-force control neural network 460.

At decision diamond 810, it is determined whether the predefined number of self-learning iterations has been reached. If not, then the process loops back to the box 808 to continue in self-learning mode with human co-training.

If the number of iterations for self-learning mode has been reached at the decision diamond 810, then at box 812 the vision-force servoing controller system switches to operation in autonomous mode. Operation in the autonomous mode may be considered "normal production operation" of the robotic system, where there is no ongoing self-learning, and there is no human co-training.

That is, the vision-force control neural network 460 provides a target position based on the vision data from the image encoder 450 (per FIG. 6), and the admittance control block 480 uses the target position and robot feedback to perform force control of robot motion. The admittance control block 480 and the robot 420 operate on a control cycle at a certain frequency, and at a lower frequency the visual servoing control is performed, where new vision data is provided to the vision-force control neural network 460 along with force and state data feedback from the robot, and the vision-force control neural network 460 provides a new target position to the admittance control block 480. During operation in the autonomous mode, data for each assembly operation may continue to be stored in the database 522, but data from these iterations is not used for ongoing training of the vision-force control neural network 460. Also, during operation in the autonomous mode, the pseudo-random sampling technique is no longer used, because the neural network 460 is no longer being trained, and because the initial workpiece position relative to the installed position may not be controllable in production operations.

At decision diamond 814, it is determined whether performance in autonomous mode is acceptable. Acceptable performance means that failures (to assemble the parts) are rare and not increasing in frequency. Exact parameters regarding acceptable performance may be defined to suit any particular application. If performance is acceptable, the process loops back to the box 812 for continued operation in autonomous mode.

Operation in autonomous mode may continue indefinitely in some applications. However, if performance becomes unacceptable, then from the decision diamond 814 the process loops back to the box 808 to resume operating the vision-force servoing controller system is operated in self-learning mode. As described above, the self-learning mode includes co-training, where the human operator 550 controls the system for at least some of the operations (such as by teleoperation or some form of manual teaching) and guides the robot to successfully complete the assembly. As explained before, when operating in the self-learning mode, the vision-force servoing controller system stores data for each assembly operation in the database 522. This causes the database 522 to have a "fresh supply" of successful operations with reward data, which are used for reinforcement learning of the vision-force control neural network 460 and result in better performance by the vision-force servoing controller system before it resumes operation in autonomous mode after a certain number of iterations.

All of the operations discussed above—including the pre-training of the vision-force control neural network 460 at the box 806, operation in self-learning mode with co-training at the box 808, and operation in autonomous mode at the box 812—are carried out with the camera 440 providing images of the workpiece operational scene to the image encoder 450, which provides vision data to the vision-force control neural network 460, as discussed several times above.

As also discussed earlier, pseudo-random sample sets with low discrepancy are preferably used in the offline pre-training of the vision-force control neural network 460 at the box 806, and in the online self-learning operation at the box 808. Pseudo-random sample sets with low discrepancy could even be used in the co-training mode of self-learning operation at the box 808, such as by having the robot 420 grasp the workpiece and move it to a designated starting location according to the pseudo-random/low discrepancy sample plan, and then having the human operator 550 guide the assembly operation from that starting location.

The methods and systems disclosed herein enable simple, automated training of a vision-force control neural network, which is then fast and accurate enough to be used in real-time vision-force servoing robotic control-in combination with compliance control of a robot performing an assembly operation. The trained neural network is robust to variations in initial workpiece location as a result of the visual servoing input, and the system is deployed with ongoing self-learning to maintain a high level of performance. In these ways, the disclosed methods and systems provide significant improvement over traditional image-based and force-only-based robotic control systems.

Throughout the preceding discussion, various computers and controllers are described and implied. It is to be understood that the software applications and modules of these computers and controllers are executed on one or more computing devices having a processor and a memory module configured for learning visual pose estimation in robotic operations. In particular, this includes a processor in the robot controller 430 of FIGS. 4 and 6, along with any optional separate computer used for data collection or for the training process of FIG. 5. One skilled in the art may envision other hardware and software architectures-such as where the image encoder 450 runs on its own computing device separate from the controller 430, or other equivalents.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A self-learning vision-force servo control robotic assembly system, said system comprising:

a robot with a gripper configured to perform an operation on a workpiece;

a sensor measuring workpiece contact force and torque data;

a camera providing images of a workpiece operational scene; and at least one computing device in communication with the robot, the sensor and the camera, the at least one computing device being configured with;

an image encoder receiving the images and outputting vision data including latent pose features of the workpiece operational scene;

a vision-force control neural network receiving the vision data, the contact force and torque data and robot state data feedback, and outputting a target position for a next motion step of the robot; and an admittance control module receiving the target position for the next motion step and robot state data feedback, and outputting motion commands to the robot, where the vision-force control neural network is pre-trained in an offline pre-training mode, and the system then operates in an online self-learning mode followed by an online fully autonomous mode.

2. The system according to claim 1 wherein the operation is an assembly task including fitting the workpiece with or into a second workpiece.

3. The system according to claim 2 wherein the workpiece operational scene in each image includes at least a portion of the workpiece in the gripper of the robot and a portion of the second workpiece indicating a placement target, and the camera is either fixed in a workspace or is mounted on an arm of the robot.

4. The system according to claim 1 wherein the image encoder has a structure including a convolutional neural network first stage and a multi-layer perceptron second stage.

5. The system according to claim 1 wherein the image encoder is trained using unsupervised learning, where sequences of images of the assembly operation are provided and contrastive learning with a loss function is used to train the image encoder to output latent pose feature vectors corresponding with a temporal distance of the workpiece from a placement target position.

6. The system according to claim 1 wherein a motion limit is applied to the target position for the next motion step before being used by the admittance control module.

7. The system according to claim 1 wherein the vision-force control neural network includes a multi-layer perceptron.

8. The system according to claim 1 wherein the vision-force control neural network is pre-trained in the offline pre-training mode using operation data from human demonstration, and training of the vision-force control neural network continues in the online self-learning mode which is switchable between an autonomous self-learning mode and a human-controlled co-training mode.

9. The system according to claim 8 wherein pseudo-random sampling with low discrepancy is used to define initial workpiece relative pose sample sets for training the vision-force control neural network in the offline pre-training mode and in the online self-learning mode.

10. The system according to claim 8 wherein the offline pre-training mode, the autonomous self-learning mode and the human-controlled co-training mode all include using reinforcement learning to train the vision-force control neural network with a dataset including, for a plurality of the operations, the vision data, the contact force and torque data, the robot state data feedback, the target position which was output, and reward data corresponding to successful completion of each of the operations.

11. The system according to claim 10 wherein the dataset used for the offline pre-training mode includes data from a plurality of the operations performed by a human demonstrator, and the dataset used for the online self-learning mode includes data from a plurality of the operations performed during the autonomous self-learning mode, the human-controlled co-training mode, or both.

12. The system according to claim 8 wherein the online self-learning mode performs a predefined number of iterations before switching to the fully autonomous mode, and the fully autonomous mode switches back to the online self-learning mode when one or more system performance parameters fall below a predefined threshold.

13. A self-learning vision-force servo control robotic assembly system, said system comprising:

a robot with a gripper configured to perform an operation on a workpiece;

a sensor measuring workpiece contact force and torque data;

a camera providing images of a workpiece operational scene; and at least one computing device in communication with the robot, the sensor and the camera, the at least one computing device being configured with;

an image encoder receiving the images and outputting vision data including latent pose features of the workpiece operational scene, the image encoder being trained using unsupervised learning, where sequences of images of the assembly operation are provided and contrastive learning with a loss function is used to train the image encoder to output latent pose feature vectors corresponding with a temporal distance of the workpiece from a placement target position;

a vision-force control neural network including a multi-layer perceptron, the vision-force control neural network receiving the vision data, the contact force and torque data and robot state data feedback, and outputting a target position for a next motion step of the robot; and an admittance control module receiving the target position for the next motion step and robot state data feedback, and outputting motion commands to the robot, where the system includes self-training using reinforcement learning wherein the vision-force control neural network is pre-trained in an offline pre-training mode, and operates in an online self-learning mode which is switchable between an autonomous self-learning mode and a human-controlled co-training mode, and an online fully autonomous mode, and pseudo-random sampling with low discrepancy is used to define initial workpiece relative pose sample sets for training the vision-force control neural network in the offline pre-training mode and in the online self-learning mode, and where the pre-training mode, the autonomous self-learning mode and the co-training mode all train the vision-force control neural network with a dataset including, for a plurality of the operations, the vision data, the contact force and torque data, the robot state data feedback, the target position which was output, and reward data corresponding to successful completion of each of the operations.

14. A method for self-learning vision-force servo control of a robotic assembly operation, said method comprising:

providing a robot with a gripper configured to perform an operation on a workpiece, a sensor measuring workpiece contact force and torque data, and a camera configured to provide images of a workpiece operational scene;

providing at least one computing device in communication with the robot, the sensor and the camera, the at least one computing device being configured with;

an image encoder receiving the images and outputting vision data including latent pose features of the workpiece operational scene, a vision-force control neural network receiving the vision data, the contact force and torque data and robot state data feedback, and outputting a target position for a next motion step of the robot, and an admittance control module receiving the target position for the next motion step and robot state data feedback, and outputting motion commands to the robot;

pre-training the vision-force control neural network in an offline pre-training mode using reinforcement learning; and operating the system in an online self-learning mode including an autonomous self-learning mode and a human-controlled co-training mode, and operating the system in an online fully autonomous mode following the online self-learning mode.

15. The method according to claim 14 wherein the operation is an assembly task including fitting the workpiece with or into a second workpiece, and where the workpiece operational scene in each image includes at least a portion of the workpiece in the gripper of the robot and a portion of the second workpiece indicating a placement target, and the camera is either fixed in a workspace or is mounted on an arm of the robot.

16. The method according to claim 14 wherein the image encoder has a structure including a convolutional neural network first stage and a multi-layer perceptron second stage, and the image encoder is trained using unsupervised learning, where sequences of images of the assembly operation are provided and contrastive learning with a loss function is used to train the image encoder to output latent pose feature vectors corresponding with a temporal distance of the workpiece from a placement target position.

17. The method according to claim 14 wherein a motion limit is applied to the target position for the next motion step before being used by the admittance control module.

18. The method according to claim 14 wherein pseudo-random sampling with low discrepancy is used to define initial workpiece relative pose sample sets for training the vision-force control neural network in the offline pre-training mode and the online self-learning mode.

19. The method according to claim 14 wherein the vision-force control neural network includes a multi-layer perceptron.

20. The method according to claim 14 wherein the vision-force control neural network operating the system in the online self-learning mode includes operation which is switchable between an autonomous self-learning mode and a human-controlled co-training mode.

21. The method according to claim 20 wherein the offline pre-training mode, the autonomous self-learning mode and the human-controlled co-training mode all include using reinforcement learning to train the vision-force control neural network with a dataset including, for a plurality of the operations, the vision data, the contact force and torque data, the robot state data feedback, the target position which was output, and reward data corresponding to successful completion of each of the operations.

22. The method according to claim 21 wherein the dataset for the offline pre-training mode includes data from a plurality of the operations performed by a human demonstrator, and the dataset used for reinforcement learning in the online self-learning mode includes data from a plurality of the operations performed during the autonomous self-learning mode, the human-controlled co-training mode, or both.

23. The method according to claim 20 wherein the online self-learning mode performs a predefined number of iterations before switching to the fully autonomous mode, and the fully autonomous mode switches back to the online self-learning mode when one or more system performance parameters fall below a predefined threshold.

* * * * *